United States Patent
Chan et al.

(10) Patent No.: US 9,954,441 B2
(45) Date of Patent: Apr. 24, 2018

(54) METHOD AND APPARATUS OF A MULTI-PHASE CONVERTOR TOPOLOGY

(71) Applicant: Solomon Systech Limited, Hong Kong (HK)

(72) Inventors: Wing Chi Stephen Chan, Hong Kong (HK); Siu Hong Lui, Hong Kong (HK); Sing Ng, Hong Kong (HK); Hon Sheung Liu, Hong Kong (HK); Xiacong Liu, Hong Kong (HK); Johnkid Lo, Hong Kong (HK); Rong Gao, Hong Kong (HK)

(73) Assignee: SOLOMON SYSTECH LIMITED, Hong Kong (HK)

( * ) Notice: Subject to any disclaimer, the term of this patent is extended or adjusted under 35 U.S.C. 154(b) by 0 days.

(21) Appl. No.: 15/497,230

(22) Filed: Apr. 26, 2017

(65) Prior Publication Data

US 2017/0310218 A1    Oct. 26, 2017

Related U.S. Application Data

(60) Provisional application No. 62/327,999, filed on Apr. 26, 2016.

(51) Int. Cl.
*H02M 3/158* (2006.01)
*H02M 3/137* (2006.01)
(Continued)

(52) U.S. Cl.
CPC ......... *H02M 3/1582* (2013.01); *H02M 3/137* (2013.01); *H02M 3/1584* (2013.01);
(Continued)

(58) Field of Classification Search
CPC .. H02M 3/1582; H02M 3/137; H02M 3/1584; H02M 2001/0009; H02M 2001/0003; H02M 3/3353; H02M 3/335
(Continued)

(56) References Cited

U.S. PATENT DOCUMENTS 5,900,712 A * 5/1999 Disser .................. H02P 25/092
                                                    318/400.12
6,466,188 B1 * 10/2002 Cato .................. H05B 33/0815
                                                    345/102

(Continued)

OTHER PUBLICATIONS

Received STIC search report from EIC 2800 searcher Mesfin Getaneh on Sep. 15, 2017.*

*Primary Examiner* — Timothy J Dole
*Assistant Examiner* — Htet Z Kyaw
(74) *Attorney, Agent, or Firm* — Idea Intellecutal Limited; Margaret A. Burke; Sam T. Yip

(57) ABSTRACT

A slim and cost effective power module solution derived from the multiple-phase buck converter technology that addresses the problems of inductor thickness and excessive magnetic material use. Such power module solution utilizes a multi-phase constant current topology and a corresponding electronic controller to provide a constant current source for various OLED lighting applications. The multi-phase constant current topology comprises two or more inductor-flyback diode feedback loops. Each inductor-flyback diode feedback loop is triggered ON and OFF out-of-phase by a current controller, which senses and estimates the average current supplied to the load, and causes the adjustments to the average current supplied to the load by controlling the ON duration of the inductor-flyback diode feedback loops.

10 Claims, 10 Drawing Sheets

(51) Int. Cl.
 *H02M 3/335* (2006.01)
 *H02M 1/00* (2006.01)
(52) U.S. Cl.
 CPC .......... *H02M 3/335* (2013.01); *H02M 3/3353* (2013.01); *H02M 2001/0003* (2013.01); *H02M 2001/0009* (2013.01)
(58) Field of Classification Search
 USPC ...................................................... 363/21.12
 See application file for complete search history.

(56) References Cited

U.S. PATENT DOCUMENTS

| | | | | |
|---|---|---|---|---|
| 7,348,948 | B2* | 3/2008 | Crawford | H05B 33/0815 345/82 |
| 8,536,842 | B2* | 9/2013 | Prodi | H02M 3/1584 323/272 |
| 9,213,346 | B2* | 12/2015 | Shiraishi | G05F 1/46 |
| 2010/0141230 | A1* | 6/2010 | Lukic | H02M 3/157 323/283 |
| 2010/0207543 | A1* | 8/2010 | Crawford | H05B 33/0815 315/294 |
| 2012/0268026 | A1* | 10/2012 | Crawford | H05B 33/0815 315/210 |
| 2017/0245339 | A1* | 8/2017 | Modepalli | H05B 33/0857 |
| 2017/0310205 | A1* | 10/2017 | Coleman | H02M 1/15 |

\* cited by examiner

| Converters | Inductors | Relative amount of magnetic material used |
|---|---|---|
| FIG. 1 - Single-phase Current Converter | 1x 60uH 1.2A | 100% |
| FIG. 2 - Single-phase Current Converter | 16x 15uH 0.6A | 200% |
| FIG. 3 - Multi-phase Voltage Converter | 4x 15uH 0.6A | 50% |

METHOD AND APPARATUS OF A MULTI-PHASE CONVERTOR TOPOLOGY

CROSS-REFERENCE OF RELATED PATENT APPLICATIONS

The present application claims priority to U.S. Provisional Application No. 62/327,999 filed Apr. 26, 2016; the disclosure of which is incorporated herein by reference in its entirety.

FIELD OF THE INVENTION

The present invention is generally related to electric current regulation methods and apparatuses applicable in driving light emitting devices. More specifically, the present invention is related to electric current regulation methods and apparatuses that incorporate multi-phase topologies applicable in driving light-emitting diodes (LEDs), including organic light-emitting diodes (OLEDs).

BACKGROUND

Compared with traditional lighting technologies such as tungsten bulbs, fluorescent tubes and LEDs, OLEDs have the advantages of having slim physical sizes, wide color variety, and physical bendability. These characteristics of OLEDs avail the technology to many new applications, such as decorative and effect lighting, which were not practically achievable in the past. For example, an OLED lighting module, without the accompanying power convertor and mechanical supporting structure, may have a thickness of less than 1 mm. On the other hand, its relatively high price at the present limits its application in general lighting purposes.

Similar to LED lighting and unlike tungsten bulbs and fluorescent tubes, OLED lighting requires to be driven by electric current as power source and brightness control. Therefore, a power converter is required to provide a controlled electric current. In the applications of decorative OLED lighting, the power sources are often 12-48V DC voltage sources. A power converter is then used to convert the constant voltage to a controlled constant current. A conventional power converter uses a single-phase buck current converter as shown in FIG. 1. It converts a direct current (DC) voltage to the controlled constant current.

To maintain the slimness and bendability of an OLED lighting panel (i.e. within 1.5 mm thickness including mechanical supporting structure), the power converter needs to be thin as well. Otherwise, the power module cannot be integrated into the OLED panel and must be installed separately and connected to the OLED panel with long wires. Long wires carrying constant current are not desirable as there can be substantial energy loss in the transmission. More importantly, the wires of individual panels have to be separated due to its constant current nature, and cannot be combined to save space and cost.

To build a 1.5 mm thick power module, all components needed to be 1.0 mm or less in height as 0.5 mm is normally reserved for the flexible printed circuit board (PCB) and mechanical mount. Among the electronic components within a power module, inductors with low profiles are the least available components. For instance, a normal surface mount 15 uH 0.6 A inductor already has a thickness of 1 mm. As another example, a low-profile 60 uH 1.2 A inductor has a thickness of 5 mm, while an inductor with a normal profile is even thicker.

On the other hand, an OLED lighting panel usually has a large surface area (i.e. 100 mm×100 mm is commonly found and 300 mm×100 mm is forthcoming) that can easily conceal a power module there behind. This means that there are more space allowance in the length and width dimensions, but very limited in the height dimension for the power module. As such, the inductor's thickness is the critical factor, and there is no practical solution in the art currently to enable slim power modules for OLED lighting due critically to the thickness of normal inductors.

A possible but undesirable solution is to replace one thick inductor by multiple smaller thin inductors, so that the thickness of the power converter can be reduced in the expense of having a larger occupying area in the length and width dimensions. For example, as shown in FIG. 2, the 60 uH 1.2 A inductor is replaced by a network of sixteen 15 uH 0.6 A inductors. Since the height of each 15 uH 0.6 A inductor is only about 1.0 mm, the power converter with this network of inductors may meet the thickness requirement. However, the total magnetic material used is doubled as compared with the single 60 uH 1.2 A inductor. Also, the much higher component count increases material cost and assembly cost significantly. The amount of magnetic material used is a major factor affecting the size of the inductors.

SUMMARY OF THE INVENTION

A multiple-phase buck converter is a currently available technology for voltage conversion, which delivers a constant voltage output. Such technology has been commercially deployed for more than 15 years. For example, in modern personal computers, multi-phase voltage converters are deployed to provide low voltage high current power in reduced size and weight power supply modules. FIG. 3 shows an exemplary 4-phase buck voltage converter. Compared with the 16-inductor solution described above, one of its advantages is that the multi-phase buck converter solution delivers the same amount of power with less magnetic material. In this case, only four 15 uH 0.6 A inductors are required, which use only ¼ or ½ of the magnetic material compared with those in the above undesirable solution or the single inductor solution respectively. FIG. 4 shows a comparison between these solutions.

It is an objective of the present invention to provide a slim and cost effective power module solution derived from the multiple-phase buck converter technology that addresses the aforementioned problems. Such power module solution utilizes a multi-phase constant current topology and a corresponding electronic controller to provide a constant current source for various OLED lighting applications.

It is another objective of the present invention to provide such constant current source for various OLED lighting applications with programmability.

BRIEF DESCRIPTION OF THE DRAWINGS

Embodiments of the invention are described in more detail hereinafter with reference to the drawings, in which.

DETAILED DESCRIPTION OF THE INVENTION

In the following description, methods and apparatuses of electric current regulation and the like are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
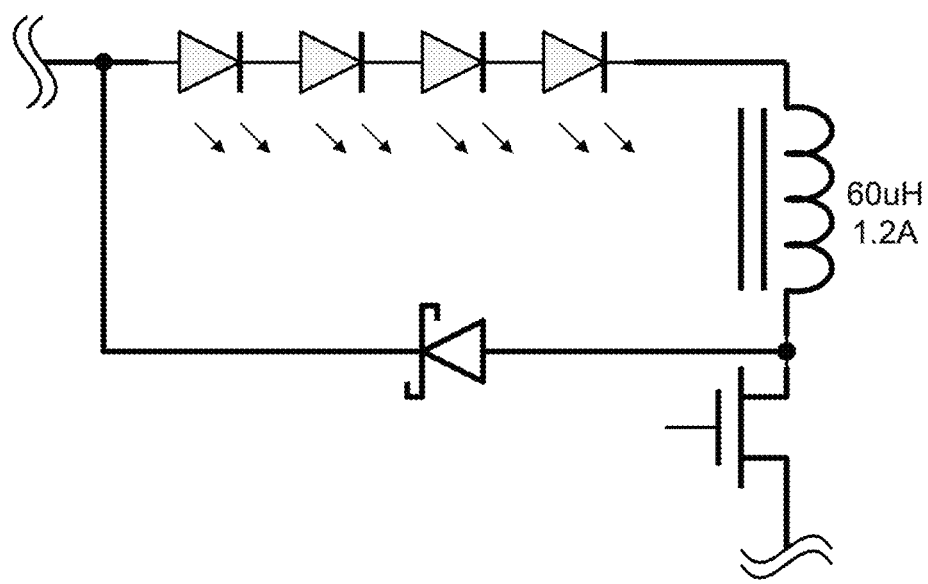
FIG. 1 depicts a circuit diagram of a conventional single-phase buck current converter.
Figure 2:
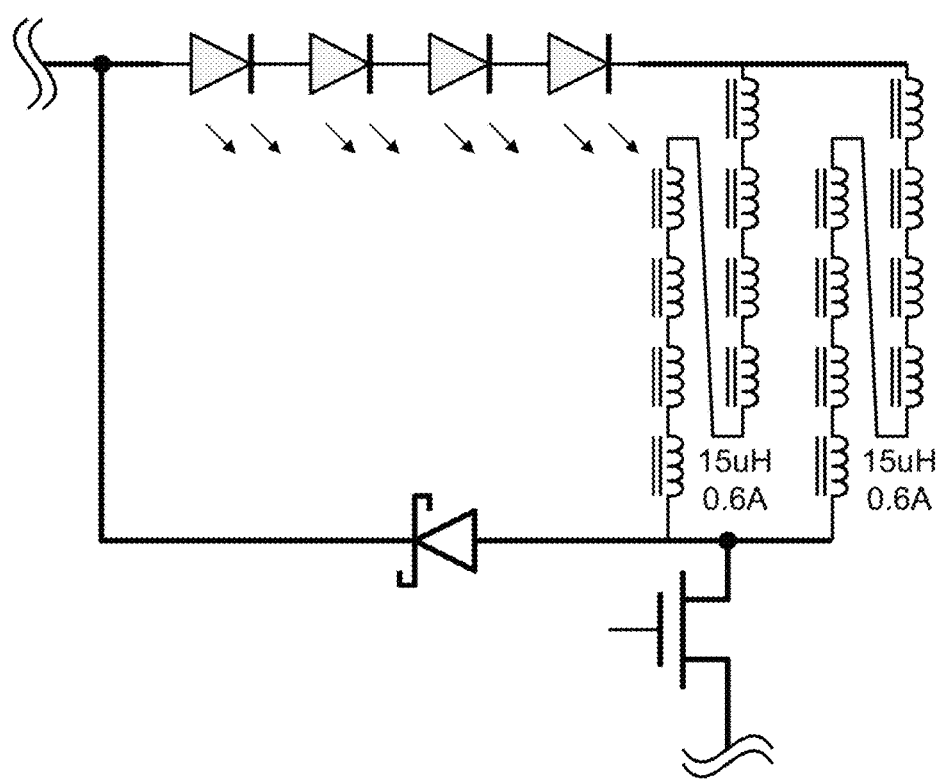
FIG. 2 depicts a circuit diagram of a conventional single-phase buck current converter having 16 smaller inductors in place of a big inductor.
Figure 3:
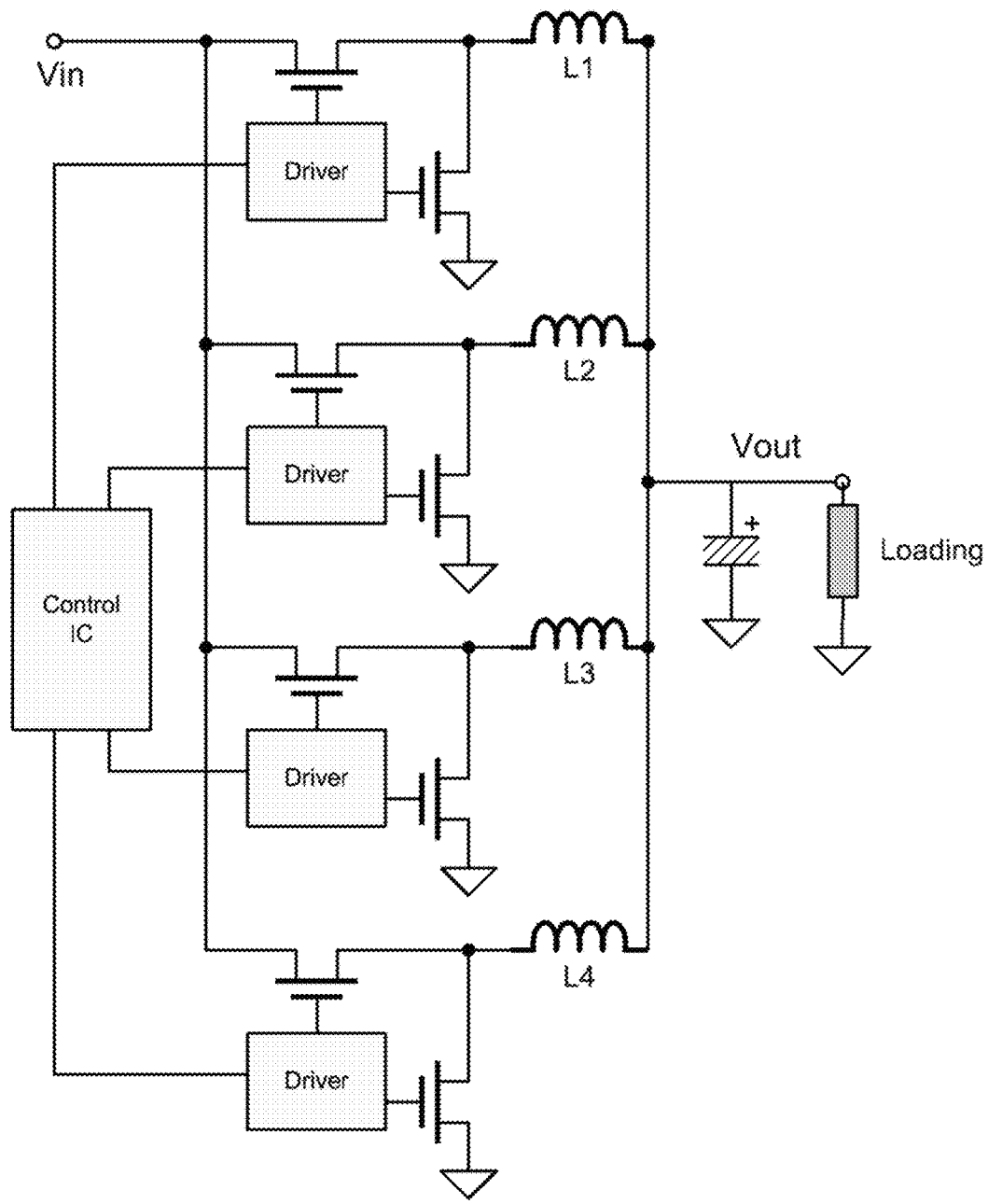
FIG. 3 depicts a circuit diagram of a 4-phase buck voltage converter.
Figures 4, 5:
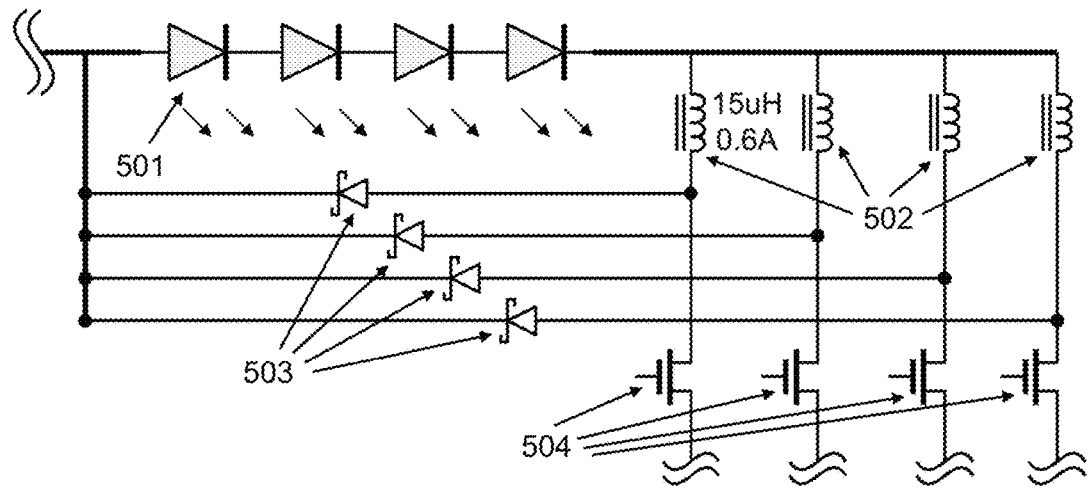
FIG. 4 shows a table comparing the amount of magnetic material used between different combinations of converters and inductors.
FIG. 5 depicts a circuit diagram of a multi-phase constant current topology in accordance to one embodiment of the present invention.

A 4-phase constant current topology circuit diagram is used to more clearly illustrate the present invention. An ordinarily skilled person in the art would appreciate that a two, three, five, six, or any reasonable number of phases multi-phase constant current topology can be achieved with the same concept underlying the 4-phase constant current topology without undue experiments. Various embodiments of the present invention are based on the multiple-phase constant current topology with a control circuit forming a complete stable feedback loop. Referring to FIG. 5. A simplified 4-phase constant current topology shown in FIG. 5 comprises four inductors 502, each connected to the cathode of a series of one or more OLED loads 501, and each connected in series with one of the four flyback diodes 503 forming a feedback loop back to the anode of the series of one or more OLEDs 501. The four inductor-flyback diode feedback loops are connected in parallel and each can be switched on and off by one of the switches 504.

Figure 6:
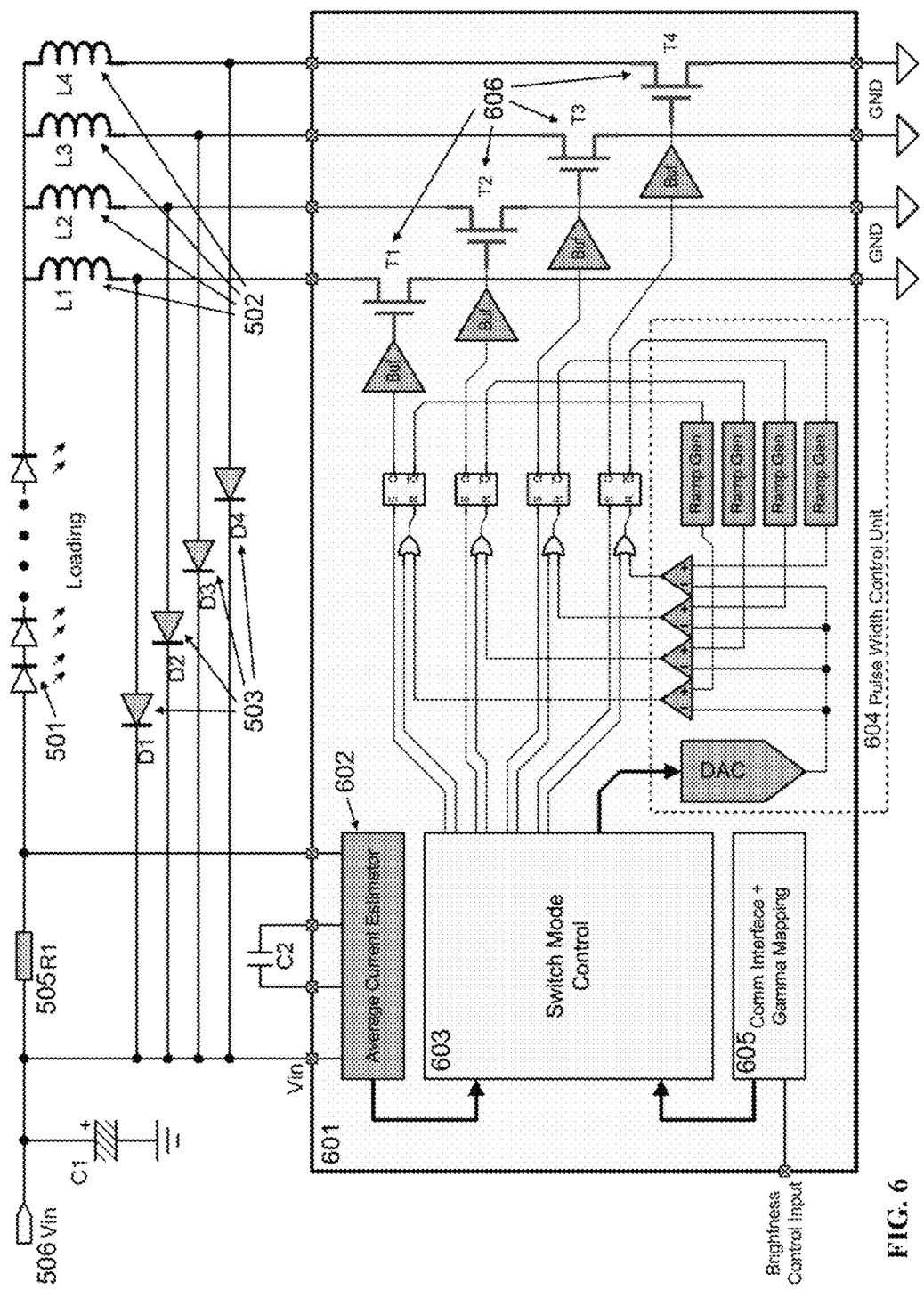
FIG. 6 depicts a system circuit diagram of a multi-phase converter topology for OLED lighting in accordance to one embodiment of the present invention.

Referring to FIG. 6. FIG. 6 depicts a circuit diagram of a complete 4-phase converter topology with corresponding control electronics for achieving a stable operation of the controlled feedback loop for OLED lighting. In accordance to one embodiment, the complete 4-phase converter topology with corresponding control electronics comprises a current controller 601 connected to the inductor-flyback diode feedback loops. The current controller 601 comprises at least the following components: an average current estimator 602 connected in parallel to a current sensing resistor R1 505, which is connected in series to the anode of the series of one or more OLED loads 501; a switch mode control unit 603; a pulse width control unit 604; four switches (implemented as power FETs $T_1, T_2, T_3,$ and $T_4$ 606 in this embodiment) and their corresponding driving circuitries each connected to one of the four inductor-flyback diode feedback loops; and a communication interface 605.

Average Current Estimator

The electric current supplied to the series of one or more OLED loads is contributed by two paths:

(1) when an inductor-flyback diode feedback loop is switched OFF, electric current flows directly from $V_{in}$ 506, through the series of one or more OLED loads 501, the corresponding inductor 502, and finally through the corresponding switch 606 to ground; during this period of time, the inductor 502 is building up magnetic field around its magnetic core (i.e. storing energy); and (2) when an inductor-flyback diode feedback loop is switched ON, electric current flows in a loop starting from the energized inductor 502, through the corresponding flyback diode 503, the series of one or more OLED loads 501, and back to the corresponding inductor 502; during this period of time, the inductor 502 is collapsing magnetic field around its magnetic core (i.e. releasing energy).

This storing and releasing of energy happen to every inductor-flyback diode feedback loop at different time (out of phase). Thus, the aggregated current supplied to the series of one or more OLED loads 501 is a constant direct current with amplitude ripples.

In practice, perfectly matching inductors are difficult to achieve in manufacturing (i.e. good quality inductors may have a variation within +/−10%). As such, slight variations within a tolerance range exist among identically rated inductors, and this inductance variation further exacerbates the ripples in the aggregated current supplied to the series of one or more OLED loads 501. On the other hand, as each inductor-flyback diode feedback loop is being switched ON and OFF out of phase of the others, this tends to smooth out the amplitude ripples. In general, the ripples are larger for a topology of less phases (i.e. 3 phases) and smaller for a topology of more phases (i.e. 6 phases). For a 4-phase constant current topology, the ripples can be controlled to be within 10% of the maximum aggregated current amplitude using medium grade inductors. The average current estimator 602 is to measure and estimate the average current output of the constant current source to the OLED loads, and in this case, the average of the aggregated current being supplied to the series of one or more OLED loads 501. This information is then relayed to the switch mode control unit 603 for analysis.

Figure 7:
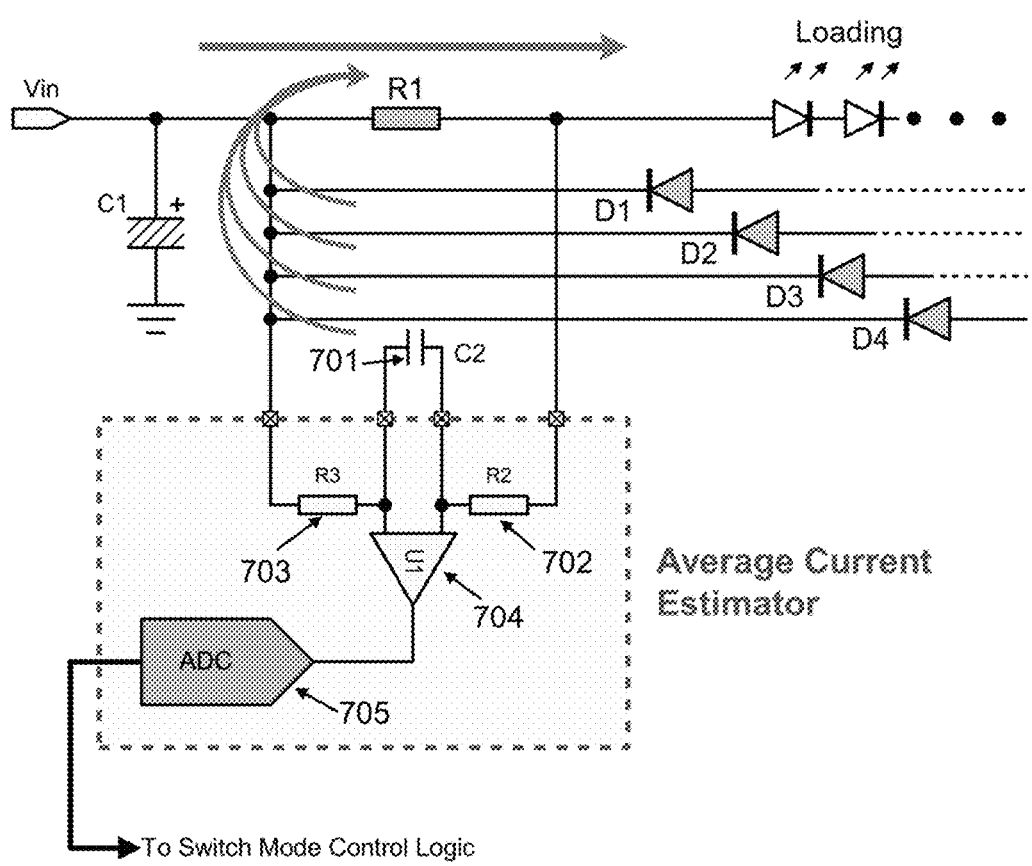
FIG. 7 depicts the circuit diagram of the average current estimation used in the multi-phase converter topology shown in FIG. 6.

Referring to FIG. 7. In accordance to one embodiment of the present invention, the average current estimator 602 first takes a voltage drop measurement across a low-ohm current sensing resistor R1 505 (i.e. 0.2 ohm with 1.2 A current capacity rating). The voltage drop measurement is then passes through a low pass filter comprising a capacitor C2 701 connected in series between two resistors R2 702 and R3 703, providing an average voltage drop measurement, which is proportional to the average aggregated current being supplied to the series of one or more OLED loads 501, to a high-side amplifier U1 704. By the selection of capacitor C2 701 and resistors R2 702 and R3 703, the low pass filter bandwidth is tuned to be 5-10% of the switching frequency of the switches $T_1$, $T_2$, $T_3$, and $T_4$ 606 to enable a good estimation on the average aggregated current being supplied to the series of one or more OLED loads 501. The high-side amplifier U1 704 buffers, amplifies, and level-shifts the average voltage drop measurement to generate the estimated value of the average aggregated current being supplied to the series of one or more OLED loads 501. The analog estimated value of the average aggregated current is then fed to the analog-to-digital convertor (ADC) 705 to convert into digital data to be relayed to the switch mode control unit 603 for analysis.

Figure 8:
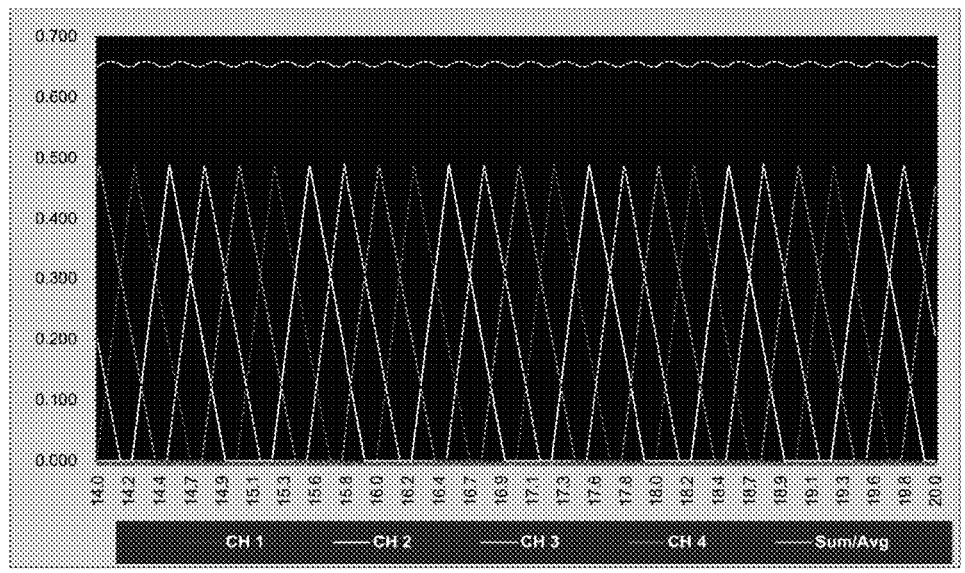
FIG. 8 shows the aggregated current over time of a simulation of the multi-phase converter topology shown in FIG. 6 with perfectly matching inductors.
Figure 9:
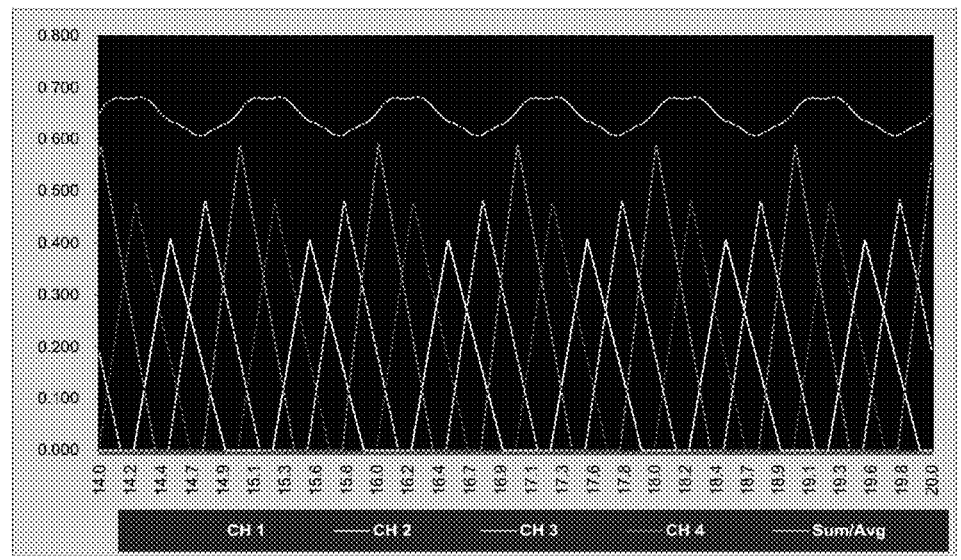
FIG. 9 shows the aggregated current over time of a simulation of the multi-phase converter topology shown in FIG. 6 with inductors of variation.

FIG. 8 shows the aggregated current supplied to the series of one or more OLED loads 501 over time of a simulation of the complete 4-phase converter topology shown in FIG. 6 with perfectly matching inductors 502 rated at 8 uH. FIG. 9 shows the aggregated current supplied to the series of one or more OLED loads 501 over time of a simulation of the complete 4-phase converter topology shown in FIG. 6 with inductors 502 of variation rated at 8 uH, 9.5 uH, 8 uH, and 6.5 uH. It can be observed from these simulations that the variation in inductors leads to larger ripples in the aggregated current.

Pulse Width Control Unit

Figure 10:
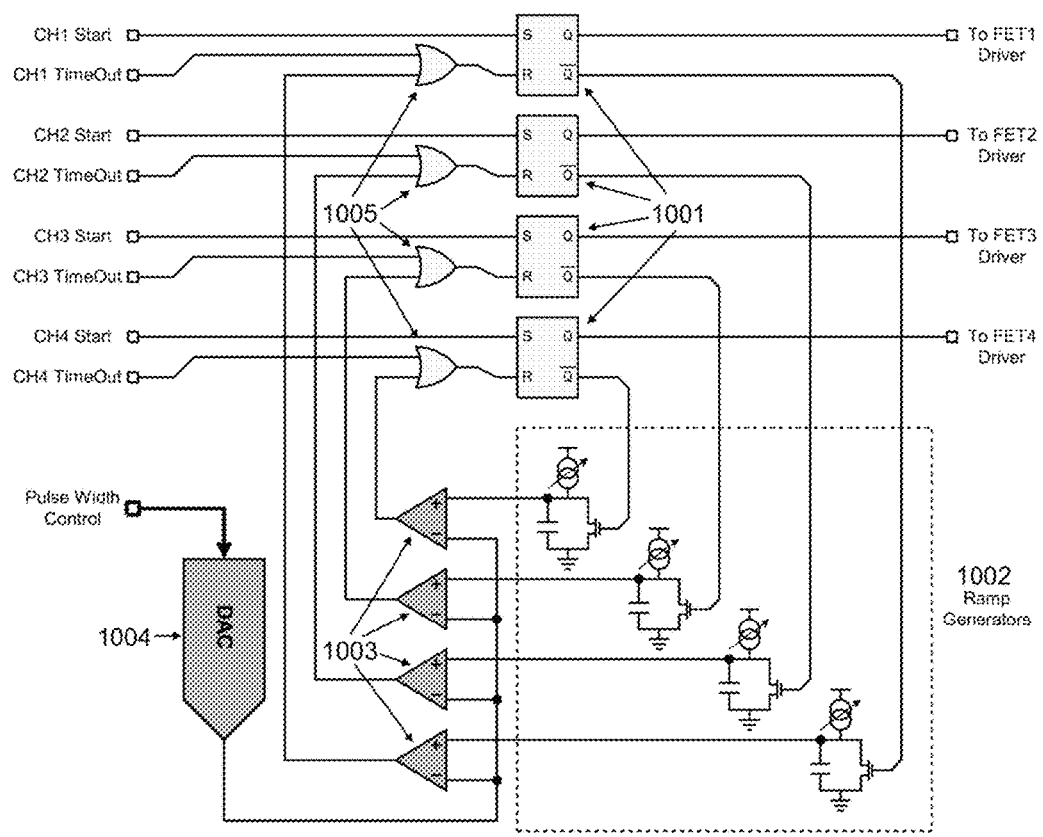
FIG. 10 depicts the circuit diagram of the pulse width control unit and the switch driving circuitries used in the multi-phase converter topology shown in FIG. 6.
Figure 11:
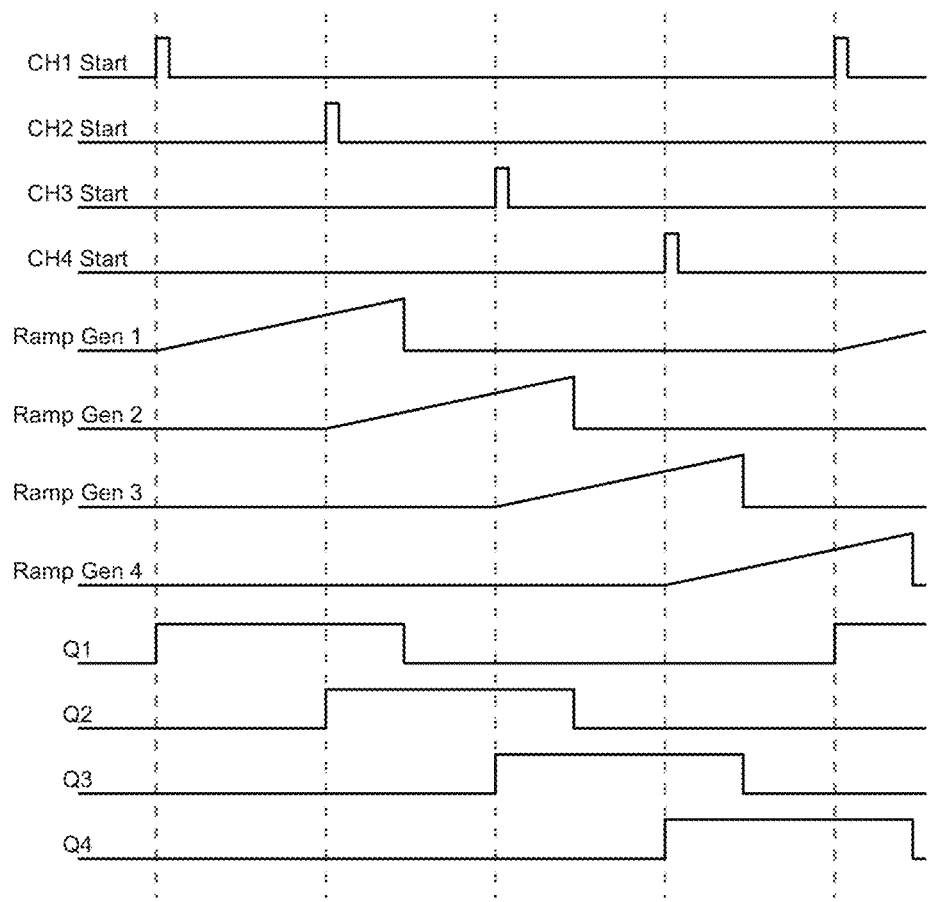
FIG. 11 shows a signal timing diagram of the pulse width control unit used in the multi-phase converter topology shown in FIG. 6.

Referring to FIG. 10. FIG. 10 depicts the circuit diagram of the pulse width control unit and switch-driving circuitries used in the complete 4-phase converter topology. The pulse width control unit 604 sets the ON durations of each of the inductor-flyback diode feedback loops (channels). The beginning of the ON duration is triggered by the switch mode control unit 603. In this embodiment of the complete 4-phase converter topology, the switch mode control unit 603 is programmed to trigger the ON duration of each channel every 90 degrees (i.e. 0.25 us in a 1 MHz switching cycle). The trigger of an ON duration of a channel starts by the switch mode control unit 603 sending a logic HIGH pulse (set pulse signal) to the S input of the corresponding S-R latch 1001. Then the Q output of the corresponding S-R latch 1001 outputs a logic HIGH signal and the corresponding switch (power FET $T_1$, $T_2$, $T_3$, or $T_4$ 606) is turned ON. In the same instant, the Q_bar output of the corresponding S-R latch 1001 outputs a logic LOW signal to activate the corresponding ramp generator 1002 to generate a ramping voltage signal to the differential input of the corresponding comparator 1003. At the differential input of the corresponding comparator 1003 is the ramping voltage signal and the output DC voltage signal of the digital-to-analog converter (DAC) 1004, which takes as input a digital data signal from the switch mode control unit 603. As time passes, when the corresponding comparator 1003 senses the ramping voltage rises above the DAC voltage level, the comparator 1003 toggles its output from logic LOW to logic HIGH (reset pulse signal) at the R input of the corresponding S-R latch 1001. This resets the S-R latch 1001 and switches OFF the corresponding switch (power FET $T_1$, $T_2$, $T_3$, or $T_4$ 606). FIG. 11 shows a signal timing diagram of the pulse width control unit 603.

The ON duration of a channel is related to the output DC voltage signal of the DAC 1004, which is controlled by the switch mode control unit 603 by providing a value of DC voltage level (ON duration length data value). The higher the DC voltage level of the DAC 1004 output voltage signal, the longer the ON duration (or pulse width). The switch mode control unit 603 sets the value of the DC voltage level (ON duration length data value) according to the average aggregated current supplied to the series of one or more OLED loads 501 and this information is provided by the average current estimator 602 as described above.

Figure 12:
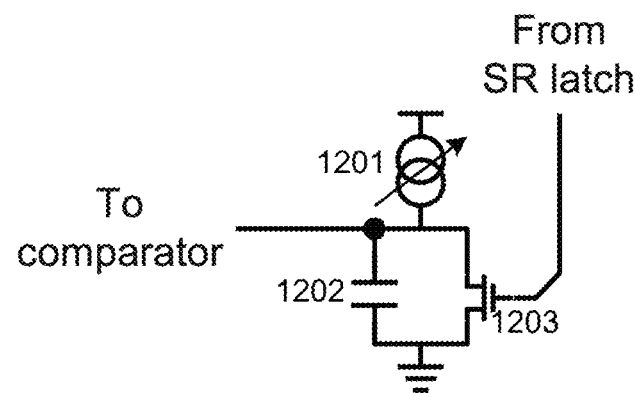
FIG. 12 depicts the circuit diagram of the ramp generator used in the multi-phase converter topology shown in FIG. 6.
Figure 13:
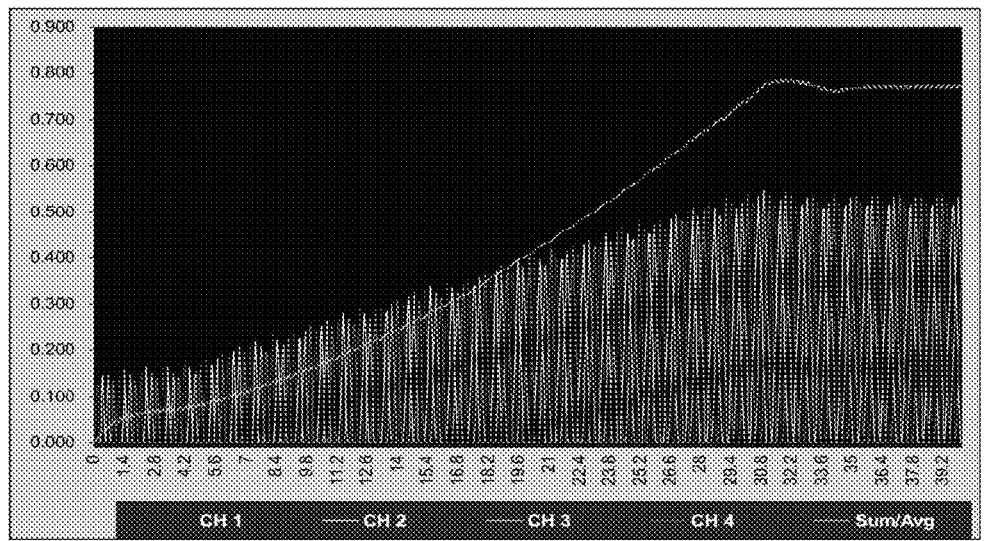
FIG. 13 lists the components' parameter values and shows the current over time of a simulation of the multi-phase converter topology shown in FIG. 6 during a start up stage where the average current supplied to the OLED loads started from 0 A and settled at about 0.8 A.

FIG. 12 depicts the circuit diagram of the ramp generator 1002. The ramping voltage signal is generated by a constant current source 1201 charging an internal capacitor 1202. When the switch mode control unit 603 commands to turn ON a channel, the Q_bar output of the corresponding S-R latch 1001 outputs a logic LOW, and the nMOS switch 1203 of the corresponding ramp generator 1002 is turned OFF, causing the constant current source 1201 to start charging the internal capacitor 1202 and generating a ramping voltage signal output to the corresponding comparator 1003.

Timeout STOP Control

Referring again to FIG. 10. In the switch driving circuitries, it is shown in FIG. 10 that each of the switches (power FETs $T_1$, $T_2$, $T_3$, and $T_4$ 606) can be turned OFF by two signals. At the R input of each of the S-R latches 1001 is an OR gate 1005. Feeding to each OR gate 1005 are the two signals: a first signal from the corresponding comparator 1003 that toggles its output from logic LOW to logic HIGH at the end of the corresponding channel ON duration (reset pulse signal); and a second signal from the switch mode control unit 603 which is called the timeout STOP control signal. For safety reason, the switch mode control unit 603 provides this timeout STOP control signal for each channel. The switch mode control unit 603 outputs this timeout STOP control signal when it detects that the inductor-flyback diode feedback loop is out of normal feedback controllable range and needs to protect the OLED lighting module from burn out. This timeout STOP control signal can be especially useful in lighting and converter module design stage when the optimal inductor size has not yet been determined, in which either anyone or all of the input source voltage, the OLED voltage drop, the power FET switching frequency, and the required operating current can affect the selection of the inductor size.

Switch Mode Control Unit

The switch mode control unit 603 comprises at least logic circuitries for obtaining input data signals from the average current estimator 602 and the communication interface 605; and generating the output signals for controlling the timing and length of each channel's ON duration (set pulse signal and ON duration length data value), and the safety time out STOP control signals for the channels.

Communication Interface and Gamma Mapping

The communication interface 605 receives external data input and provides a target brightness value to the switch mode control unit 603. The switch mode control unit 603 compares this target brightness value, after scaling, with the information receives from the average current estimator 602 (ADC output). Since the average current supplied to the series of one or more OLED loads 501 directly correlates to the OLEDs' brightness, that the higher the average current means the brighter the OLEDs, the switch mode control unit 603 adjusts the brightness of the series of one or more OLED loads 501 by raising or reducing the average current supplied to the series of one or more OLED loads 501. If decreased brightness is desired, the switch mode control unit 603 provides a lower (than present) value to the DAC 1004 to shorten the ON duration of the channels (i.e. shorter pulse width of the pulse width control signal). In the contrary, if increased brightness is desired, the switch mode control unit 603 provides a higher (than present) value to the DAC 1004 to lengthen the ON duration of the channels (i.e. longer pulse width of the pulse width control signal).

Upon receiving the target brightness value from the communication interface 605, a gamma mapping is performed. Gamma mapping (also known as gamma correction) is a non-linear process that converts the target brightness value to target average current value to be supplied to the series of one or more OLED loads 501. Due to human visual perception to brightness being non-linear (i.e. greater sensitivity to low brightness, and less sensitivity to high brightness), a gamma mapping is applied to "counterbalance" this human visual perception. Gamma mapping can be implemented using digital logic circuit or a look-up table stored in non-volatile memory.

Although the foregoing embodiments of multiple-phase constant current topology are applied in OLED lighting, an ordinarily skilled person in the art would appreciate that the same inventive concept can be applied in other lighting applications, such as those with LEDs.

The embodiments disclosed herein may be implemented using general purpose or specialized computing devices, computer processors, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

In some embodiments, the present invention includes computer storage media having computer instructions or software codes stored therein which can be used to program computers or microprocessors to perform any of the processes of the present invention. The storage media can include, but are not limited to ROMs, RAMs, flash memory devices, or any type of media or devices suitable for storing instructions, codes, and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A multiple-phase circuit topology for providing constant current, comprising:
    two or more inductor-flyback diode feedback loops around a load, wherein each of the inductor-flyback diode feedback loop comprises a flyback diode connected in series with an inductor for directing current from the inductor back to the load;
    a current controller connected to the two or more inductor-flyback diode feedback loops, the current controller configured to:
        estimate an average of an aggregated current being supplied to the load;
        trigger an ON duration of each of the two or more inductor-flyback diode feedback loops; and
        control a length of the ON duration of each of the two or more inductor-flyback diode feedback loops;
    wherein each of the two or more inductor-flyback diode feedback loops is switched ON and OFF out of phase of the others so to produce the aggregated current supplied to the load as a constant direct current.

2. The multiple-phase circuit topology for providing constant current of claim 1, further comprising:
    a current sensing resistor connected in series with the load;
    wherein the estimation of the average of the aggregated current being supplied to the load comprising a measurement of voltage drop across the current sensing resistor.

3. The multiple-phase circuit topology for providing constant current of claim 1,
    wherein the current controller comprises an average current estimator for estimating the average of the aggregated current being supplied to the load;
    wherein the average current estimator comprises:
        a low pass filter with a bandwidth that is substantially less than the ON-OFF switching frequency of the inductor-flyback diode feedback loops for low-pass filtering the measurement of voltage drop across the current sensing resistor; and
        a high-side amplifier for buffering, amplifying, and level-shifting the measurement of voltage drop to generate an estimated value of the average aggregated current being supplied to the load.

4. The multiple-phase circuit topology for providing constant current of claim 1, wherein the current controller comprises:
    a pulse width control unit for generating driving signals for a switch connected to the corresponding inductor-flyback diode feedback loop to switch ON and OFF, providing the ON durations of the inductor-flyback diode feedback loop;
    wherein the pulse width control unit comprises:
        two or more ramp generators for generating ramping voltage signals, each of the ramp generators corresponds to one of the inductor-flyback diode feedback loops; and
        two or more comparators, each corresponding to one of the ramp generators; and
    wherein each of the comparators is configured to:
        compare one of the ramping voltage signals to a DC voltage signal; and
        when the ramping voltage signal reaches the DC voltage signal level, generate a reset pulse signal to switches OFF the switch and in turn switches OFF the corresponding inductor-flyback diode feedback loop connected to the switch.

5. The multiple-phase circuit topology for providing constant current of claim 1, wherein the current controller comprises:
    two or more switches, each connected to one of the inductor-flyback diode feedback loops and configured to switch ON and OFF, providing the ON durations of the inductor-flyback diode feedback loop; and
    two or more switch driving circuitries, each connected to one of the switches and comprising a S-R latch;
    wherein the S-R latch is configured to:
        receive a set pulse signal for switching ON the corresponding switch; and
        receive a reset pulse signal or a safety timeout STOP control signal for switching OFF the corresponding switch.

6. The multiple-phase circuit topology for providing constant current of claim 1, wherein the current controller comprises:
   a switch mode control unit configured to:
      receive an estimated value of an average aggregated current being supplied to the load;
      receive an external data input for a target brightness of the load;
      generate a set pulse signal for each of the inductor-flyback diode feedback loops for triggering the ON duration of the inductor-flyback diode feedback loop;
      generate an ON duration length data value as a value of DC voltage level for the inductor-flyback diode feedback loops; and
      generate a safety timeout STOP control signal for switching OFF one or more of the inductor-flyback diode feedback loops when an abnormal feedback is detected on the inductor-flyback diode feedback loop.

7. The multiple-phase circuit topology for providing constant current of claim 1, wherein the load is a series of one or more OLED.

8. The multiple-phase circuit topology for providing constant current of claim 1, wherein the number of inductor-flyback diode feedback loops is four.

9. The multiple-phase circuit topology for providing constant current of claim 1, wherein the number of inductor-flyback diode feedback loops is three.

10. The multiple-phase circuit topology for providing constant current of claim 1, wherein the number of inductor-flyback diode feedback loops is six.

\* \* \* \* \*